Inventor
Abed G. Kahale
By Baynd H. Michael
Attorney

United States Patent Office 3,540,131
Patented Nov. 17, 1970

3,540,131
INTEGRATED MOISTURE SENSING DRYER
CONTROL WITH TIMED TERMINATION
Abed G. Kahale, Roselle, Ill., assignor to Controls Company of America, Melrose Park, Ill., a corporation of Delaware
Filed Jan. 17, 1969, Ser. No. 791,958
Int. Cl. F26b 13/10
U.S. Cl. 34—45                                    7 Claims

ABSTRACT OF THE DISCLOSURE

Turning the control knob actuates the cams to a desired position while at the same time the proper circuit selection is made to set the electronic moisture sensing circuit to obtain the desired performance. When the desired degree of dryness is sensed the timer motor is energized to complete the cycle including additional heating in some cases but always including a cool-down period. Simultaneous actuation of the switches actuated by the cams is achieved by fixing the cams relative to each other but having lost motion relative to the shaft so actuation of one switch-cam will unbalance the cam assembly and actuate the other switch-cam. This achieves simultaneous switching without precise tolerances or adjustments. When set for "air fluff" operation the timing is both electronic and mechanical.

CROSS-REFERENCES TO RELATED APPLICATIONS

The moisture sensing circuit and the control of the timer motor is shown and claimed in Beller application Ser. No. 669,890, filed Sept. 22, 1967.

BACKGROUND OF INVENTION

In the Beller application there is shown a moisture sensing control which controls the energization of a timer which, in turn, terminates the dryer operation. Thus the timer effects the power switching and eliminates expensive power relays and the like. To operate the control the timer must be set and the desired moisture level must also be selected.

SUMMARY OF INVENTION

The present control allows simultaneous setting of the moisture level and the timer with a single manually operated knob. This simplifies operation for the user and permits building the timer and electronic components in a single package. To permit low cost manufacture while insuring proper actuation of the switches the cams are fixed relative to each other but with limited lost motion (10°) relative to the driven timer shaft. Therefore, if one of the two cams starts to actuate its switch ahead of the other cam the forces will be such as to move both cams relative to the shaft and permit the second cam to "catch up" and actuate its switch.

This arrangement lends itself to a novel circuit arrangement wherein the time period available for dryer operation without heat (as in the "cool-down" stage) is extended for "air fluff" by adding an electronically (R–C) timed period.

DESCRIPTION OF PREFERRED EMBODIMENT

Figure 1:
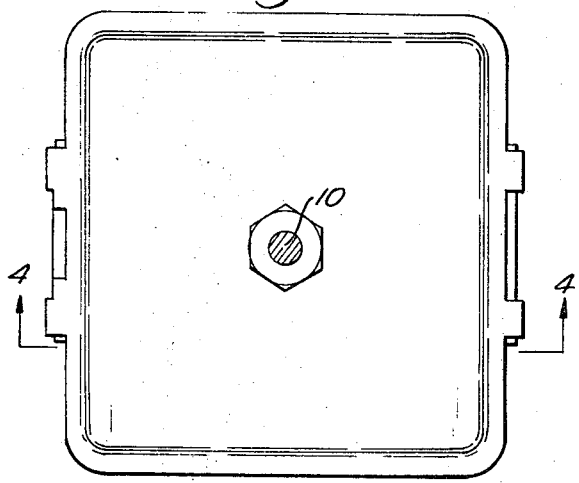
FIG. 1 is a top plan view of the control.
Figure 2:
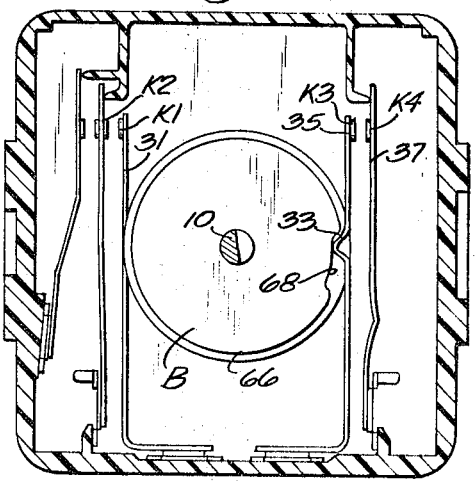
FIG. 2 is a section taken on line 2—2 in FIG. 4.
Figure 3:
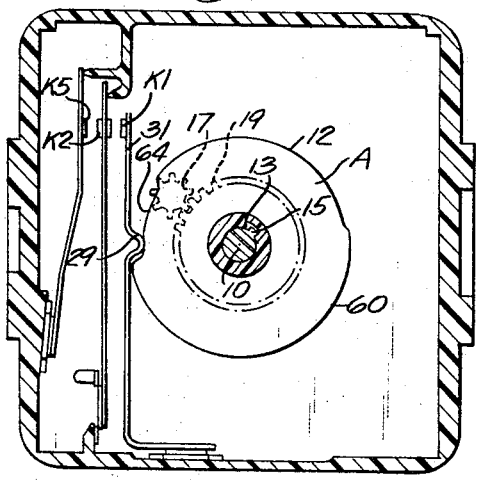
FIG. 3 is a section taken in line 3—3 in FIG. 4.
Figure 4:
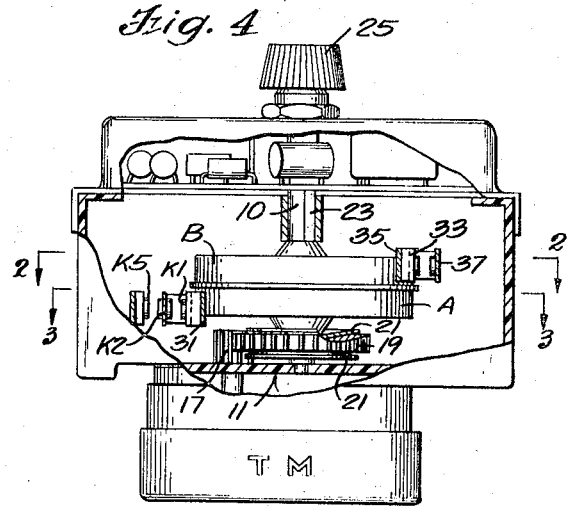
FIG. 4 is a vertical view with parts broken away generally as indicated by 4—4 in FIG. 1.
Figure 5:
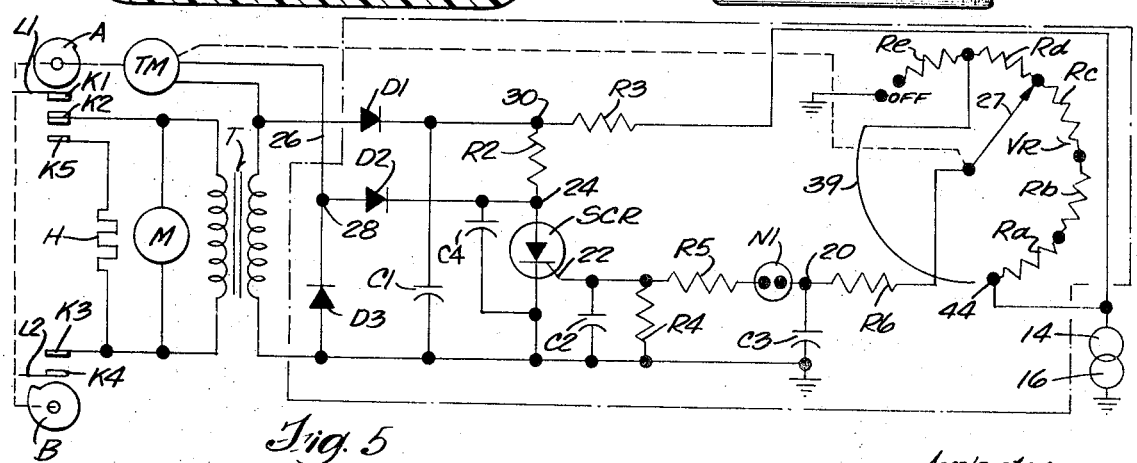
FIG. 5 is a schematic of the control applied to a dryer.

The timer motor TM is connected to shaft 10 through the gearing 11 to rotate the cams A and B which are fixed on an arbor 12 having a key way 13 receiving the shaft key 15 with a loose fit allowing approximately ten degrees motion of the arbor 12 and the cams A and B relative to the shaft 10. The gearing 11 comprises drive pinion 17 and main gear 19 which has friction engagement (or clutch) with the shaft 10 through friction discs 21, 21, thus allowing the shaft 10 to be rotated relative to gear 19 without having to back up the usual reduction gearing connected with and driving pinion 17. Shaft 10 is connected to the shaft 23 on which knob 25 is mounted. This shaft 23 carries a suitable wiper arm 27 (not shown in the mechanical drawings since the form is immaterial) which cooperates with a suitable printed circuit board to facilitate selection of the desired moisture level. The printed circuit board additionally carries the electronic components embraced in the broken line in the schematic drawing and pictorially shown in FIG. 4. Rotation of knob 25 in a counterclockwise direction can override the friction engagement with the timer motor to effect selection of the proper circuit (as will appear more fully hereinafter) and to rotate the cams A and B to, in turn, cause these cams to effect the desired closure of the switches operated thereby. The control is illustrated in the "off" position in FIGS. 1–4. When the knob is rotated to rotate the cams and wiper blade counterclockwise the first thing that happens is that cam A lifts the follower portion 29 of switch blade 31 to close contact $K_1$ on contact $K_2$ while cam B closes contact $K_3$ on contact $K_4$ by actuating the rider portion 33 of blade 35 to lift the blade toward the blade 37. While this has occurred the wiper 27 has moved on to the continuous conductor portion 29 of switch blade 31 to close contact $K_1$ on dryer motor M is across the lines $L_1$, $L_2$ and AC voltage is applied to the transformer T. On the secondary of the transformer the diode $D_1$ passes the positive half of the AC wave form through resistance $R_3$ and thence to sensor ring 14. Voltage applied to ring 14 will leak to ground from ring 16 at a rate dependent upon the moisture content of the clothes in the drum bridging the rings. If the clothes are wet the charge will leak to ground rapidly but as the clothes become drier the leakage will become progressively less and the charge on ring 14 will increase. The charge on ring 14 is applied to junction 44 and then passes through the variable resistor VR to the point where wiper 27 makes connection. The voltage picked up at the point of connection of the wiper with the variable resistor VR is then applied through $R_6$ to junction 20 which is connected to the neon bulb $N_1$ and also to ground through capacitor $C_3$. The function of the variable resistor VR will be explained more fully hereinafter. When the charge at junction 20 and, hence, on capacitor $C_3$ builds up to the firing voltage of $N_1$ as a result of dry clothes limiting leakage to ground the neon bulb becomes conductive to supply a pulse of energy through resistance $R_5$ and to gate 22 of the silicon controlled rectifier SCR to render the SCR conductive. Capacitor $C_2$ bypasses random electric impulses to $L_2$ to prevent false triggering. Resistance $R_4$ provides a path for the SCR gate leakage current.

Going back now to the timer motor TM, it will be noted that one side of the motor is connected to lead $L_1$ and the other side of the motor is connected to diode $D_2$ leading to junction 24. Lead 26 from the motor is also connected at junction 28 to line $L_2$ through diode $D_3$ which is set to block the positive of the AC supply but to pass the negative of the AC supply. Diode $D_2$ is connected to pass the positive of the AC supply but since junction 24 on the output side of $D_2$ is not normally connected to permit conduction the timer motor TM is supplied only with the negative of the AC supply through diode $D_3$ and will not operate. When, however, the SCR is rendered conductive a conductive path is available for the positive of the AC supply through diode $D_2$ and the SCR to lead $L_2$. Therefore, the timer motor now sees full AC supply and starts operating.

It will be noted that junction 24 is connected to line $L_1$ at junction 30 through resistance $R_2$. Therefore, under normal conditions the voltage at junction 30 is higher than at 24 so $D_2$ cannot pass the positive of the AC supply. It will also be noted that the output side of diode $D_1$ is connected to the line $L_2$ through capacitor $C_1$. This capacitor is charged at a potential equivalent to the potential at junction 30. Normally the SCR would tend to extinguish as the positive of the AC supply fell off through $D_2$ as the AC supply fell to zero. Capacitance $C_1$, however, can now discharge through resistance $R_2$ to keep the SCR conductive until the next positive-going signal comes through $D_2$ at which time, of course, $D_1$ is passing current to recharge capacitance $C_1$. In this way the SCR is kept conductive even though the neon may have extinguished. Capacitance $C_4$ connected in parallel around SCR and capacitance $C_2$ connected between the gate of the SCR and line $L_2$ function to smooth any random electric impulses which may possibly appear in the circuit and prevent rendering the SCR conductive on a random, false signal.

From the foregoing it will be seen that after the timer motor is started as a result of the SCR becoming conductive the timer motor is assured continual operation. Since the motor drives the power switch cams A and B and also drives the wiper 27 both cams and the wiper will be driven towards the "off" position. Now going back to understand more fully the function of the wiper, it will be seen that when the wiper is moved from the "off" position through approximately 150° it will be on that portion of the printed circuit designated 39 and which corresponds to air fluff. This segment 39 is connected to the junction between resistors $R_d$ and $R_e$ which constitute parts of the variable resistor VR which is comprised of resistors $R_a$ through $R_e$ with $R_a$ usually being the smaller value and each subsequent resistor generally being larger. It will be clear that when the wiper is placed in the air fluff position it now connects, in effect, through the resistors $R_a$ through $R_d$ which constitutes a considerable dropping resistance. Therefore, the rate of charge buildup on the capacitor $C_3$ tending to fire the neon $N_1$ will be quite slow and this, then, becomes simply an RC timing network (in air fluff operation the clothes are already dry). After the neon fires and the timer motor starts it will then drive the wiper and the cams A and B back to the "off" position. When the knob 25 is rotated in a counterclockwise direction to place the wiper between $R_a$ and $R_b$ the control is set for the maximum damp position. When passing junction 44 the cams A and B will be in such position that cam A will now close contact $K_2$ on contact $K_5$ to energize heater H. Now the dryer motor and heater are operating and will continue to do so until the neon fires at which time the timer motor TM will start driving the wiper and the cams towards the "off" position in a clockwise direction. Additional heat will be supplied to the dryer until the wiper passes junction 44 at which time the cam A will be positioned so that the follower 29 will drop off of the highest surface 60 on the cam down to surface 62. This will open contact $K_2$ from $K_5$ and break the heater circuit while maintaining the circuit through the motor. Therefore, the time occupied in running from 44 to the "off" position will be a cool-down period with no heat but drum rotation continued.

If the control knob 25 is rotated to the full counterclockwise position all of the variable resistor VR will be cut into the circuit and this is the "full dry" position. When the neon now fires, the timer motor will drive the wiper and cam assembly in the clockwise direction and this, therefore, will give overdrying for the period of time it takes to reach the junction 44 at which time the heater is dropped out of the circuit. This, then, is followed by the cool-down period for as long as it takes to get to the "off" position. In the "off" position the wiper will be grounded to take off any charge remaining on capacitor $C_3$ so that the next operation will start from zero charge on the capacitor $C_3$.

When the timer reaches the "off" position the cam A moves out from under the follower 29 so the follower drops from the surface 62 to surface 64 while at substantially the same time the cam B should move out from under the follower 68 to allow it to drop from the high surface 66 to the low surface 68 and open contacts $K_3$ and $K_4$. If these actions do not occur substantially simultaneously the ramping effect as the first follower tends to drop will serve to accelerate the assembly of cams A and B in the clockwise direction so that the lagging action will be brought into synchronism. Therefore, substantially simultaneous actuation of the switches is achieved with minimal tolerances and with little need of precision in forming or adjusting the followers 29 and 33.

With the foregoing construction it will be readily appreciated that the single knob 25 can be employed to not only set the control into operation but to select the desired moisture level. The timer motor will not be started until the desired degree of dryness has been obtained at which time the timer motor will be energized to secure the designed additional heating period plus a timed cool-down period. When, however, the knob is turned to place the wiper in the air fluff position the initial portion of the air fluff cycle is determined by the RC time constant determined by resistors $R_a$ through $R_d$ in the charging circuit along with $R_6$ and $R_3$. When the RC time constant brings neon $N_1$ to firing voltage the neon will fire and now the timer will determine the remaining time of the cycle. That will be the time it takes to move from the set position of the wiper to the "off" position. During the air fluff cycle the heater H is not energized since the cams A and B have not been rotated far enough to close contact $K_2$ on contact $K_5$.

The control, therefore, by rotation of the knob, permits selection of an electronically and electromechanically timed circuit or a moisture sensing circuit building a charge on the capacitor at a rate determined by the charging rate and the moisture content of the clothes which constitute a leakage or discharge path for the capacitor. Since the mode of operation is determined by turning the knob, which also actuates the cams, the knob serves to place the machine into operation and, when the neon pulses, the timer motor is then energized to take over and drive the cams back to the "off" position while at the same time returning the wiper back to the "off" position. While the present control arrangement is admirably suited to the circuit shown where the SCR and the diode $D_2$, in effect, control motor operation of the timer to eliminate the need for power relay or other switching to energize the timer (all as claimed in said Beller application) it will be understood that the concept here is not confined to that type of circuit. Any moisture sensing control arrangement deriving a signal upon attainment of the desired degree of dryness can be utilized to then take that signal by whatever means energize the timer motor to drive the control back to the "off" position.

It will be understood that the foregoing description has been simplified by way of leaving out the safety interlocks such as door switches, thermostats, etc. These features form no part of the invention and would merely confuse the disclosure.

What is claimed is:

1. In a dryer having a heater and a motor for rotating a dryer drum and provided with a moisture sensing dryer control of the type applying a voltage to sensor means adapted to be within the dryer drum for leakage to ground at a rate determined by the moisture content of the contents of the drum and applying the residual voltage to a trigger means, the improvement comprising:
an electric circuit including trigger means responsive to a predetermined voltage and a charging circuit for the trigger means including a variable resistance between the voltage source and the trigger means for determining the charging rate of the trigger means subject to said leakage to ground,
the variable resistance being in the form of a rotary selector device mounted on a shaft and the magnitude of resistance selected determining the moisture level which will operate the trigger means,
cam means mounted on the shaft,
switch means operated by the cam means to control energization of the dryer heater, motor, and said electric circuit,
manual means for turning the shaft in one direction from its "off" position to turn the cam means and the rotary selector device to determine the operational state of the heater and motor and to determine the selected moisture content,
a timer motor connected to the shaft to rotate the shaft in the other direction,
and means responsive to operation of the trigger means to energize the timer motor to drive the shaft back to its "off" position.

2. Apparatus according to claim 1 in which the cam means are designed so the heater switch means is open in the rotary travel of the shaft adjacent the "off" position so a timed cool-down period is provided as the shaft is driven back to its "off" position by the timer motor.

3. Apparatus according to claim 2 in which the selector device is constructed to place at least some of said variable resistance in the charging circuit of the trigger means when the shaft is manually rotated to a position short of the position in which the cam means actuates the switch means to energize the heater whereby the trigger means is operated largely in response to the charging rate so selected and an "air fluff" cycle is provided which is determined both by the charging rate and by the subsequent timed period taken to return the shaft to its "off" position.

4. Apparatus according to claim 2 in which means are provided whereby the timer motor can be energized only by the trigger means.

5. Apparatus according to claim 1 in which the cam means is mounted on the shaft for limited relative rotation whereby the start of actuation of the switch means will urge the cam means forward in the driven direction.

6. Apparatus according to claim 1 in which the cam means includes two cams fixed on an arbor,
said arbor being mounted on the shaft for limited relative rotation
said switch means including a switch operated by each of the cams,
said cams being designed to operate both switches simultaneously at one position of the cams,
each switch including a cam follower which in combination with the cam surface develops a force tending to move the cam in the same direction as the timer motor during a switching action,
said lost motion allowing the cams to move ahead together in the event one switch is operated before the other at said one position of the cams whereby the second will be operated substantially simultaneously with the first.

7. A control for determining the operational mode of a clothes dryer and for terminating operation of the dryer comprising:
a rotatable shaft,
cam means mounted on the shaft for rotation therewith,
switch means operated by the cam means for controlling the operational state of the dryer to be controlled,
electrically energized moisture sensing control means controlled by the switch means and including rotary selector means mounted on the shaft for rotation therewith and operable to select the moisture condition to be sensed by the moisture sensing control means,
a timer motor operative to rotate the shaft and controlled by the moisture sensing control means to be rendered operative in response to the moisture sensing control means sensing the selected condition,
manual means for rotating the shaft to select the operating conditions to be sensed by the moisture sensing control means and to actuate the cam means to initiate operation of the dryer and of the moisture sensing control means.

References Cited
UNITED STATES PATENTS 3,402,478    9/1968    Hetrick _____ 34—53

CARROLL B. DORITY, JR., Primary Examiner

U.S. Cl. X.R.

34—48, 53